US011814183B2

(12) United States Patent
Parker (10) Patent No.: US 11,814,183 B2
(45) Date of Patent: Nov. 14, 2023

(54) STRAP FOR SECURING A BAG TO A PARACHUTE HARNESS (71) Applicant: IDIS CORP., Belton, TX (US)

(72) Inventor: Brian Parker, Belton, TX (US)

(73) Assignee: IDIS CORP., Belton, TX (US)

( * ) Notice: Subject to any disclaimer, the term of this patent is extended or adjusted under 35 U.S.C. 154(b) by 0 days.

(21) Appl. No.: 17/525,693

(22) Filed: Nov. 12, 2021

(65) Prior Publication Data

US 2022/0153421 A1  May 19, 2022

Related U.S. Application Data (60) Provisional application No. 63/113,583, filed on Nov. 13, 2020.

(51) Int. Cl.
*B64D 17/38* (2006.01)
*B64D 17/30* (2006.01)

(52) U.S. Cl.
CPC ............ *B64D 17/38* (2013.01); *B64D 17/30* (2013.01)

(58) Field of Classification Search
CPC ..................................................... B64D 17/38
See application file for complete search history.

(56) References Cited

U.S. PATENT DOCUMENTS

| | | | | |
|---|---|---|---|---|
| 1,041,420 A | * | 10/1912 | Bornstein | A61F 13/64 604/401 |
| 1,559,046 A | * | 10/1925 | McLeran | A45C 7/0095 383/38 |
| 2,666,926 A | * | 1/1954 | Manly | A44B 11/006 2/322 |
| 5,363,810 A | * | 11/1994 | Kraus | A01K 27/003 119/795 |
| 5,688,011 A | * | 11/1997 | Gulley | B66C 1/18 294/74 |
| D454,235 S | * | 3/2002 | Kaplan | D30/153 |
| 6,357,551 B1 | * | 3/2002 | Bogardus, III | E06C 1/56 182/196 |
| 7,585,197 B1 | * | 9/2009 | Merten | E06C 1/56 182/189 |
| 7,905,527 B1 | * | 3/2011 | Smallin | B66F 19/00 294/66.1 |
| D666,896 S | * | 9/2012 | Pinholster, Jr. | D8/356 |
| D712,555 S | * | 9/2014 | Berg | D24/190 |
| 9,003,579 B1 | * | 4/2015 | Pinholster, Jr. | A45F 3/22 5/120 |
| 9,771,159 B1 | * | 9/2017 | Grenga | B64D 17/38 |
| 9,907,389 B2 | * | 3/2018 | Conlin | A45F 3/24 |

(Continued)

*Primary Examiner* — Justin M Benedik
(74) *Attorney, Agent, or Firm* — HOLZER PATEL DRENNAN (57) ABSTRACT

A strap that may be used to secure equipment (e.g., a bag) to the parachute harness of a parachutist. The strap may provide adjustability of an effective strap length to assist in positioning the suspended equipment relative to the parachutist. The strap may include quick-release features that allow the suspended equipment to be quickly and easily disengaged (e.g., once the parachutist has landed). In turn, a transition to ground operations in which the equipment is in use may occur quickly and without heavy rigging or additional containers for stowing the equipment during the jump. In turn, the strap may be carried with the parachutist during ground operations without significant additional weight.

20 Claims, 7 Drawing Sheets (56) References Cited

U.S. PATENT DOCUMENTS

| | | | |
|---|---|---|---|
| D876,206 S * | 2/2020 | Pinholster | D8/356 |
| 2010/0001140 A1* | 1/2010 | McHugh | B64D 17/30 |
| | | | 244/148 |
| 2012/0291234 A1* | 11/2012 | Berge | B64D 17/46 |
| | | | 24/323 |
| 2021/0076666 A1* | 3/2021 | Power, II | F16B 2/08 |
| 2021/0100707 A1* | 4/2021 | Wolpe | A63B 21/4043 |
| 2022/0024597 A1* | 1/2022 | Fox, Jr. | B64D 17/386 |
| 2022/0162003 A1* | 5/2022 | Baker | A45F 3/14 |
| 2022/0387844 A1* | 12/2022 | Heard | A63B 21/4035 |

\* cited by examiner

STRAP FOR SECURING A BAG TO A PARACHUTE HARNESS

CROSS-REFERENCE TO RELATED APPLICATIONS

The present application claims benefit of priority to U.S. Provisional Patent Application No. 63/113,583, entitled "STRAP FOR SECURING A BAG TO A PARACHUTE HARNESS" and filed on Nov. 13, 2020, which is specifically incorporated by reference herein for all that it discloses or teaches.

BACKGROUND

There are many civilian and military contexts in which a parachutist must parachute while carrying additional gear (e.g., for use once on the ground). For instance, in military settings, paratroopers or the like often utilize parachutes to deploy into an area where mission objectives require the paratroopers to carry additional gear in a rucksack or other bag. In civilian settings, firefighting operations may be benefited by a parachutist jumping with an extra bag or other equipment. Other settings in which reaching a location from the ground may be dangerous or otherwise infeasible may also require a parachutist to deploy into the area with equipment to accomplish an objective.

In any regard, given the increased dangers of securing additional bags or other equipment to the parachutist, to both the parachutist and those on the ground, it is of utmost importance that any bags or other gear that are to be attached to the parachutist be provided in a secure manner that is capable of withstanding high static and dynamic loading experienced during a parachute jump. However, despite the need to securely attach bags or other gear to the parachutist, it is often very important to efficiently remove any such bags or equipment once the parachutist has landed. In this regard, current approaches and equipment for parachute rigging for attachment of bags or gear to a parachutist do not allow for securely attaching such equipment to a parachutist and also allowing for efficient removal once the parachutist has landed.

SUMMARY

In view of the foregoing, the present disclosure generally relates to a strap, methods for the use of a strap, and parachute rigging systems incorporating a strap that facilitates securing a bag or other equipment to a parachutist (e.g., to a parachute harness worn by a parachutist). Furthermore, the present disclosure facilitates the rapid disengagement of such bags or equipment by the parachutist (e.g., once the parachutist lands safely on the ground with the bag or equipment secure). Of note, the presently disclosed strap and accompanying system facilitate adjustability to allow for parachutists of different sized and/or differently sized bags or equipment to utilize a single strap design that allows for adjustability of the suspended bag or equipment relative to the parachute harness to which it is attached. Further still, the present disclosure facilitates a secure strap attachment system that allows for a bag or other equipment secured using a strap to be rapidly disengaged as desired (e.g., once on the ground). As such, a versatile system is facilitated that allows for a variety of objects to be securely attached during a parachute jump while also facilitating rapid disengagement for a transition to ground operations and/or use of the equipment previously suspended using the strap. Accordingly, the present strap and associated system may be useful in a variety of civilian and military contexts in which a parachutist requires equipment to be securely attached during a jump and in which rapid disengagement of the equipment is desired.

Particularly, a bag is a versatile container that may be suspended using the strap discussed herein. The parachutist may store a variety of objects and equipment in such a bag that is in turn, suspended from a parachute harness during a jump. In contrast to prior approaches for securing a bag to a parachute harness, the present strap is versatile, easy to use, reliable, and adds very little or no additional weight to the parachutist's load once the bag has been disengaged from the system. For example, prior approaches included the use of a parachute drop bag (PDB) in which a parachutist's main bag (e.g., a paratrooper's rucksack) is stowed during a jump. In turn, the PDB would be secured to the jumper. Once landed, a parachutist would be required to disengage the PDB from the parachute harness, remove the contents of the PDB, and stow or otherwise tend to the PDB. For example, the PDB may be required to be packed with the paratrooper once landed (e.g., to facilitate reuse of the PDB or to avoid loss of the PDB). As such, the PDB added significant additional weight and material a parachutist would have to carry once landed. The PDB also required unpacking the contents of the PDB before transitioning to ground operations. As can be appreciated, in either civilian or military applications, the ability to transition efficiently and rapidly to ground operation is of utmost importance. Furthermore, as the conditions into which parachutists are deployed are often rugged, hostile, or both, elimination of excess weight to a parachutist's load is also a significant consideration.

According to a first aspect of the present disclosure, a strap device for attaching a bag to a parachute harness is provided. The strap includes a shackle configured to be engageable with a ring of the parachute harness. The strap also includes a webbing portion comprising a continuous length of webbing. The webbing is configured to include a shackle loop disposed about to capture a portion of the shackle and a plurality of load loops defined in the continuous length of webbing configured for receipt of a portion of an attachment apparatus through one of the load loops. The attachment apparatus is configured to attach to the bag for securing the bag to the parachute harness.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

The following description is not intended to limit the invention to the forms disclosed herein. Consequently, variations and modifications commensurate with the following teachings, skill and knowledge of the relevant art, are within the scope of the present invention. The embodiments described herein are further intended to explain modes known of practicing the invention and to enable others skilled in the art to utilize the invention in such, or other embodiments and with various modifications required by the particular applications(s) or use(s) of the present invention.

Figure 1:
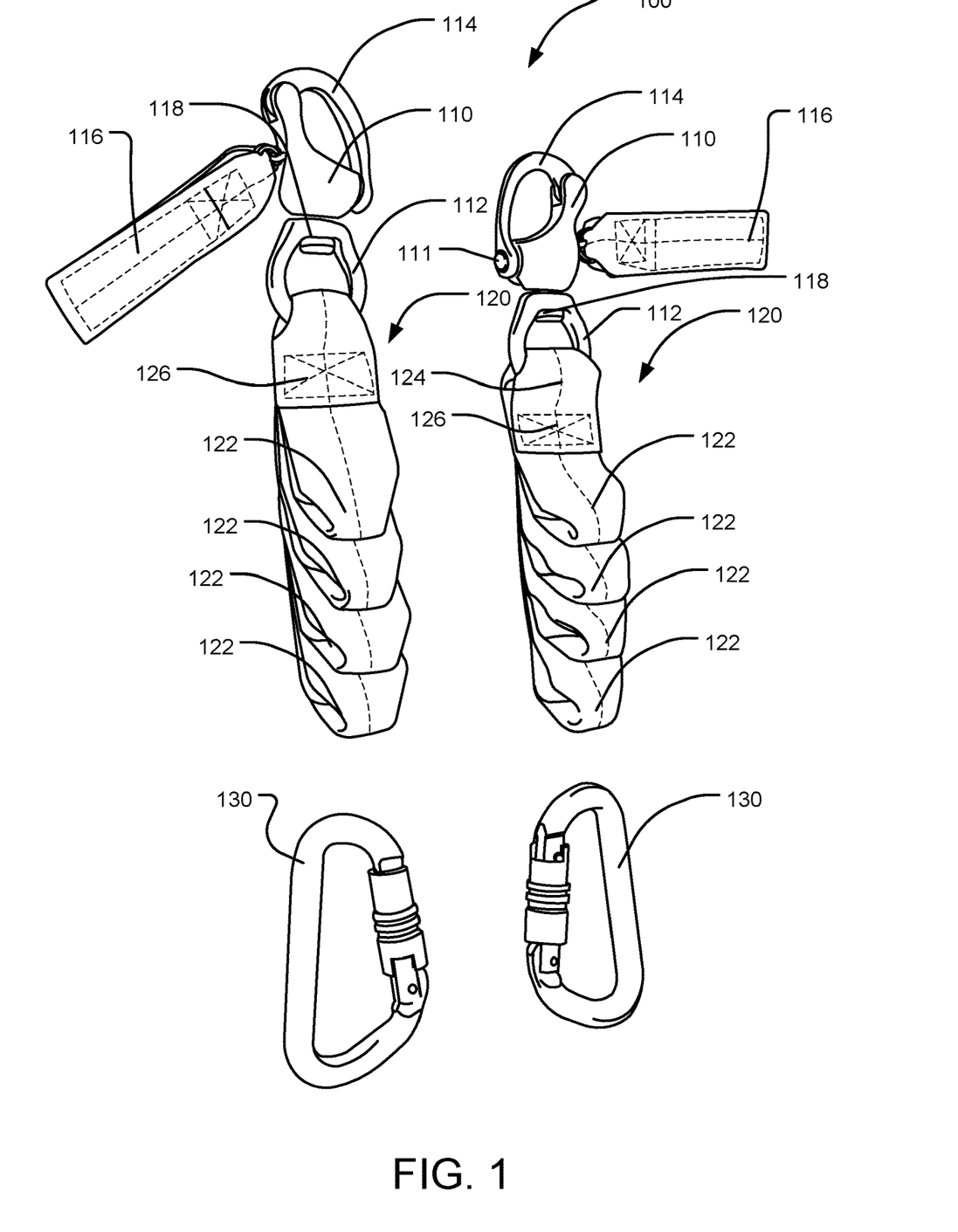
FIG. 1 depicts an example of a strap pair according to the present disclosure.

FIG. 1 illustrates an example of a pair of straps 100 according to the present disclosure. The straps 100 include a shackle 110 secured to a webbing portion 120. The webbing portion may comprise a continuous length of webbing material. The webbing material may be secured to itself form a plurality of load loops 122 in the webbing portion 120. The load loops 122 may be sized to receive an attachment apparatus 130 through one of the load loops 122. The attachment apparatus 130 shown is a locking carabiner, but other attachment apparatus 130 may be provided, including, without limitation, other types of shackles or the like.

The shackle 110 may be a quick release shackle, such as a snap shackle. That is, the shackle 110 may include a bail 114 secured by a quick-release pin 111 (seen on the right strap in FIG. 1). The pin 111 may be spring-loaded and attached to a release strap 116. In turn, upon actuation by pulling on the release strap 116, the pin 111 may disengage with the bail 114, which may pivot relative to a body of the shackle 110 to disengage from a secure mounting point (e.g., a parachute harness ring). The shackle 110 may also include a swivel 118 that attaches a ring 112 to the shackle body. The shackle 110 may be sized appropriately for the strap, bag, and/or other loads. In one example, the shackle 110 may have a load rating of not less than 2,500 lbf (1,134 kg). In this regard, even under dynamic loading, an item secured by the shackle 110 may remain secure even under dynamic loading conditions often experienced during a jump.

The ring 112 of the shackle 110 may be engaged by a shackle loop 124. The shackle loop 124 may be formed in the webbing portion 120 by securing an end portion of the webbing to itself at a stitching portion 126. In turn, the ring 112 of the shackle 110 may be securely engaged to the webbing portion 120. In turn, a plurality of load loops 122 are also defined in the webbing portion 120 and may include stitching portions between each load loop (not shown) to define the separate load loops 122 of the webbing portion.

The webbing may be Type 8 nylon webbing. In one example, the webbing may be 1" (2.54 cm) in width. The webbing may have a tensile load rating of not less than about 4,000 lbf (1,814 kg). The thread used in the stitching portions 126 to secure portions of the webbing may be Type E-69 thread having a tensile strength of not less than about 8.5 lbf (4 kg).

Figure 5:
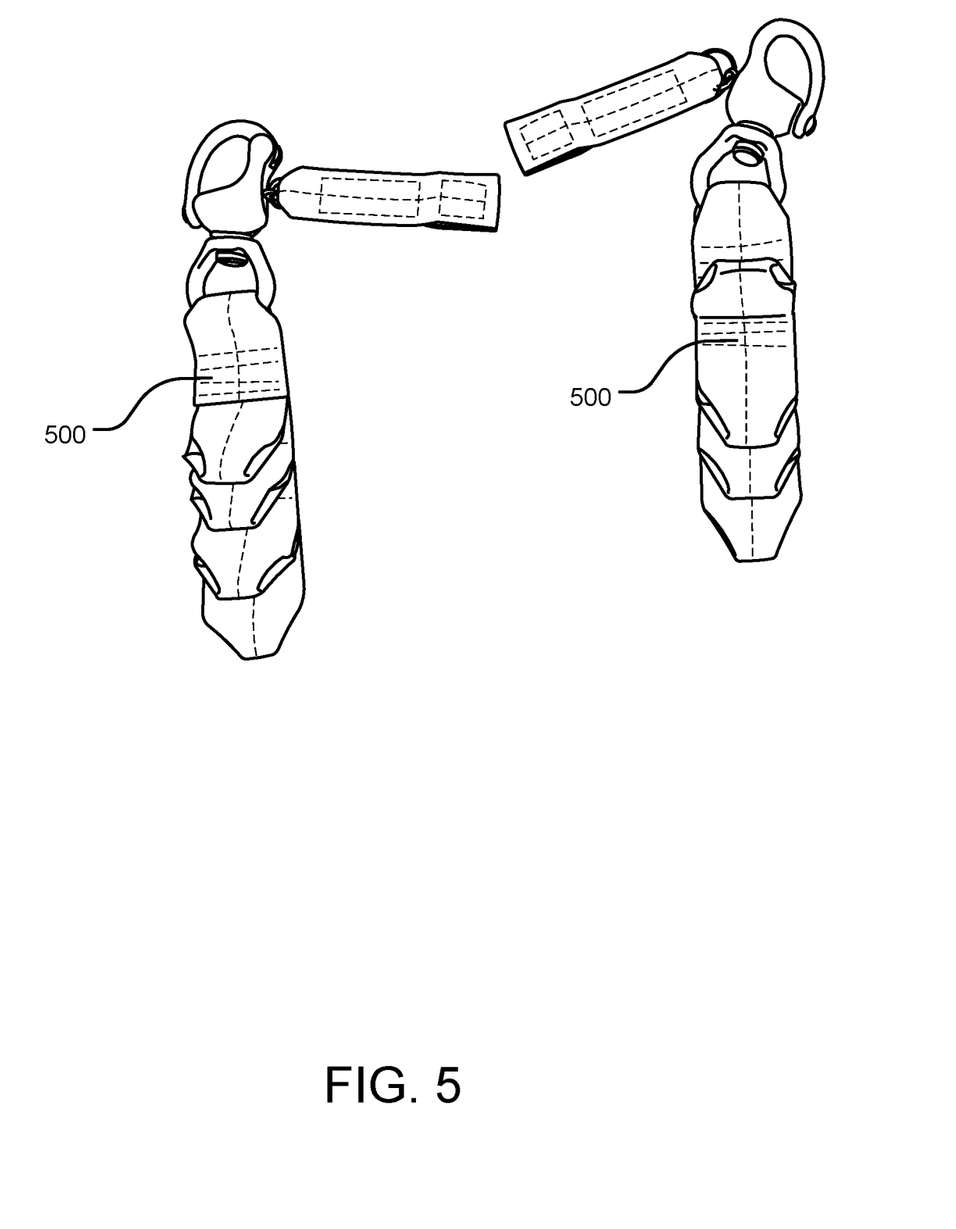
FIG. 5 illustrates an example of a strap with an alternative stitching pattern.

The stitching portions securing the webbing to form the shackle loop 124 and the load loops 122 may be any appropriate configuration. For example, as shown in FIG. 1, the stitching portion may include a box stitch with reinforced cross-stitches extending from each corner of the box stitch. Additionally or alternatively, row stitching 500, as shown in FIG. 5, may be employed to secure the webbing to form the shackle loop 124 and/or load loops 122. The row stitching 500 may comprise not fewer than two rows of stitching to attach the webbing to form the load loops 122 and/or shackle loop 124. Further still, other configurations of stitching may be provided without limitation.

Also as shown in FIG. 1, the load loop 122 and/or shackle loops 124 may include inward folded portions of the webbing defined by an outer edge of the webbing in the load loop 122 and/or shackle loop 124 folded back toward the centerline of the webbing. The outer edge of the webbing may be stitched to secure the outer edge of the webbing in the inwardly folded position. Thus, the edge of the webbing may be disposed toward the centerline of the webbing. The inwardly folded edges of the webbing may allow the attachment apparatus 130 to more easily be passed through the load loops 122 and/or reduce wear on the edge of the webbing.

Figure 2:
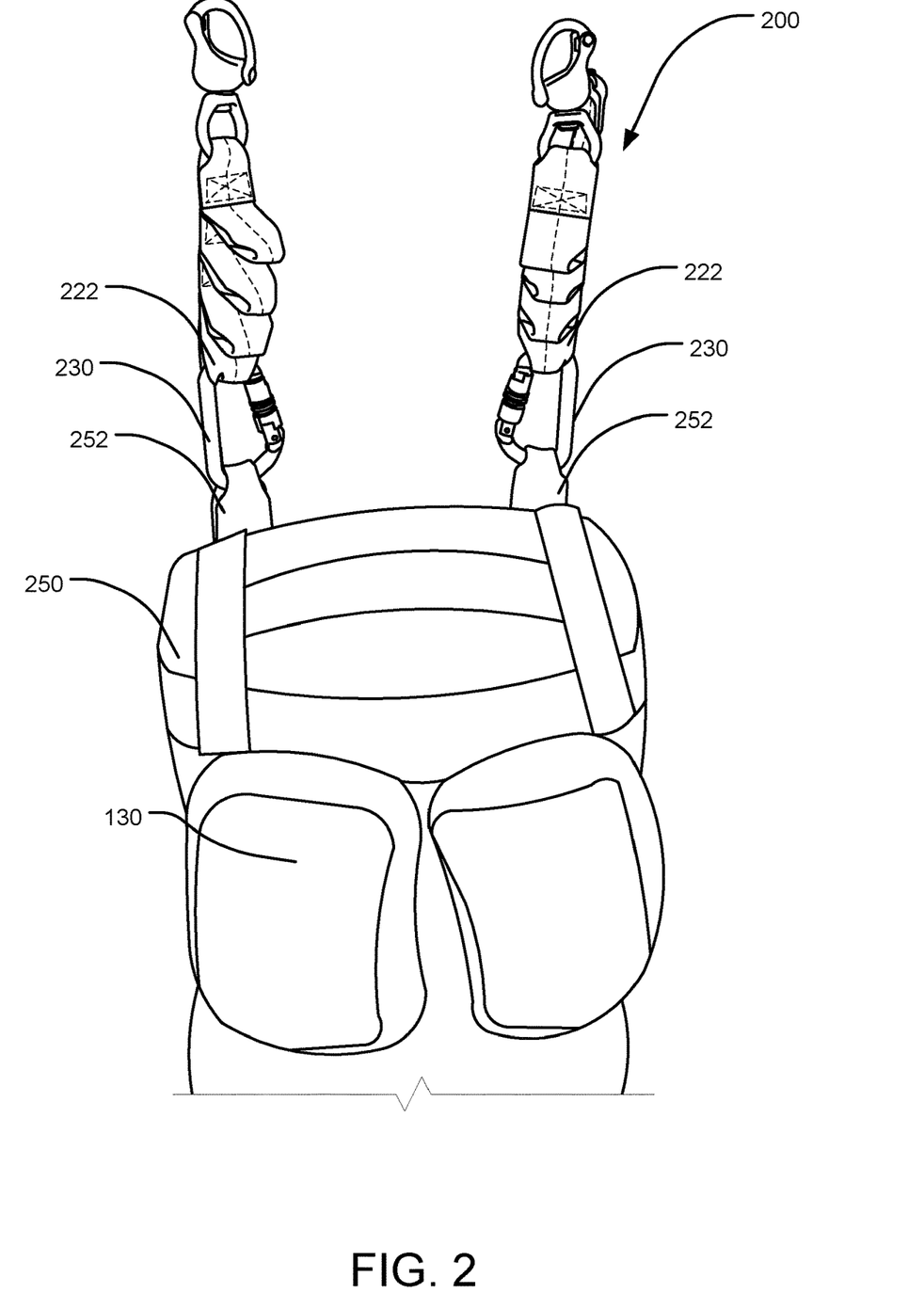
FIG. 2 depicts an example of a strap pair supportively engaged with a bag.

FIG. 2 illustrates a pair of straps 200 engaged with a bag 250. Specifically, attachment apparatuses 230 are engaged with respective load loops 222 of the straps 200. The attachment apparatuses 230 are, in turn, secured to attachment points 252 of the bag 250. Of note, the attachment apparatuses 230 may directly engage the attachment points 252 of the bag 250, thus avoiding having to provide separate attachment hardware for the bag 250, such as a PDB or other additional webbing.

Figure 3:
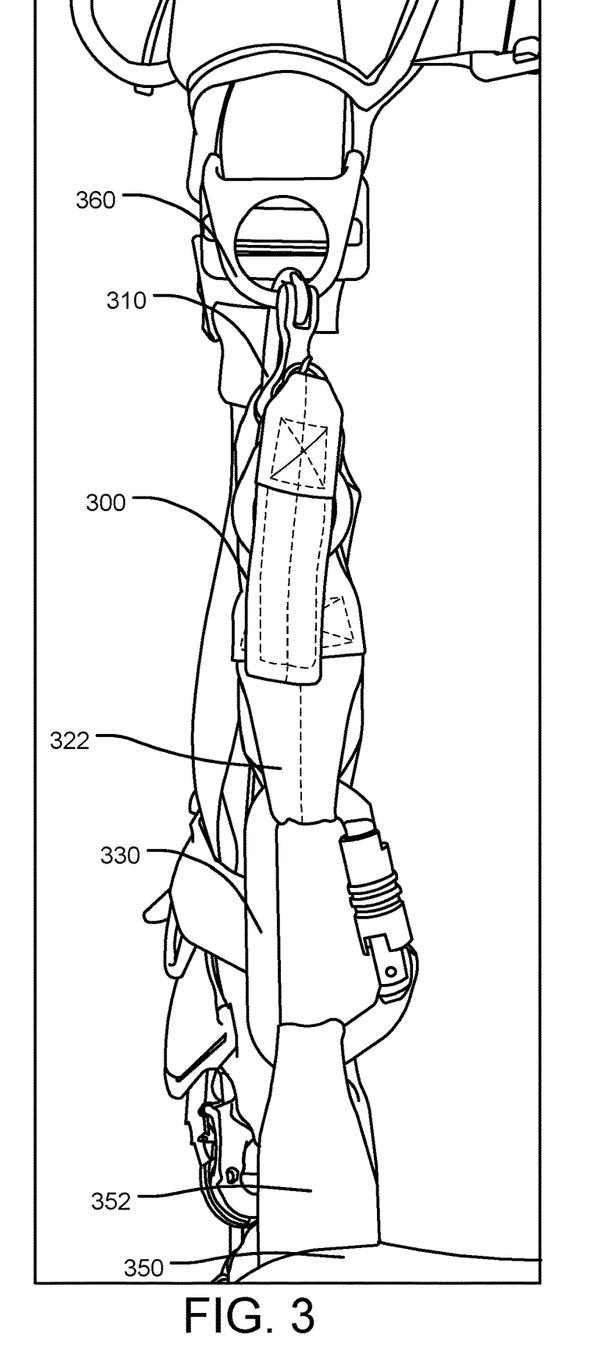
FIG. 3 depicts an example of a strap engaged with a parachute harness and a bag to engage the bag to the parachute harness.

FIG. 3 further illustrates a strap 300 for securing a bag 350 to an attachment ring 360 of a parachute harness. Specifically, the attachment ring 360 may be provided on a main lift webbing portion of the harness. In this regard, the shackle 310 may be secured to the attachment ring 360. In turn, an attachment apparatus 330 is engaged with a load loop 322 and an attachment point 352 of the bag 350. As such, the bag 350 may be secured to the parachute harness. As will be discussed in greater detail below, the position of the bag 250 relative to the jumper may be adjusted by selecting a given one of the plurality of load loops 322 of the strap 300. Also, the quick release feature of the shackle 310 may allow the bag 350 to be easily disengaged by the jumper (e.g., upon landing) to transition to ground operations quickly and efficiently. The strap 300 may be left attached to the bag 350 during ground operations or may be stowed given the relatively small size of the strap 300.

Figure 4:
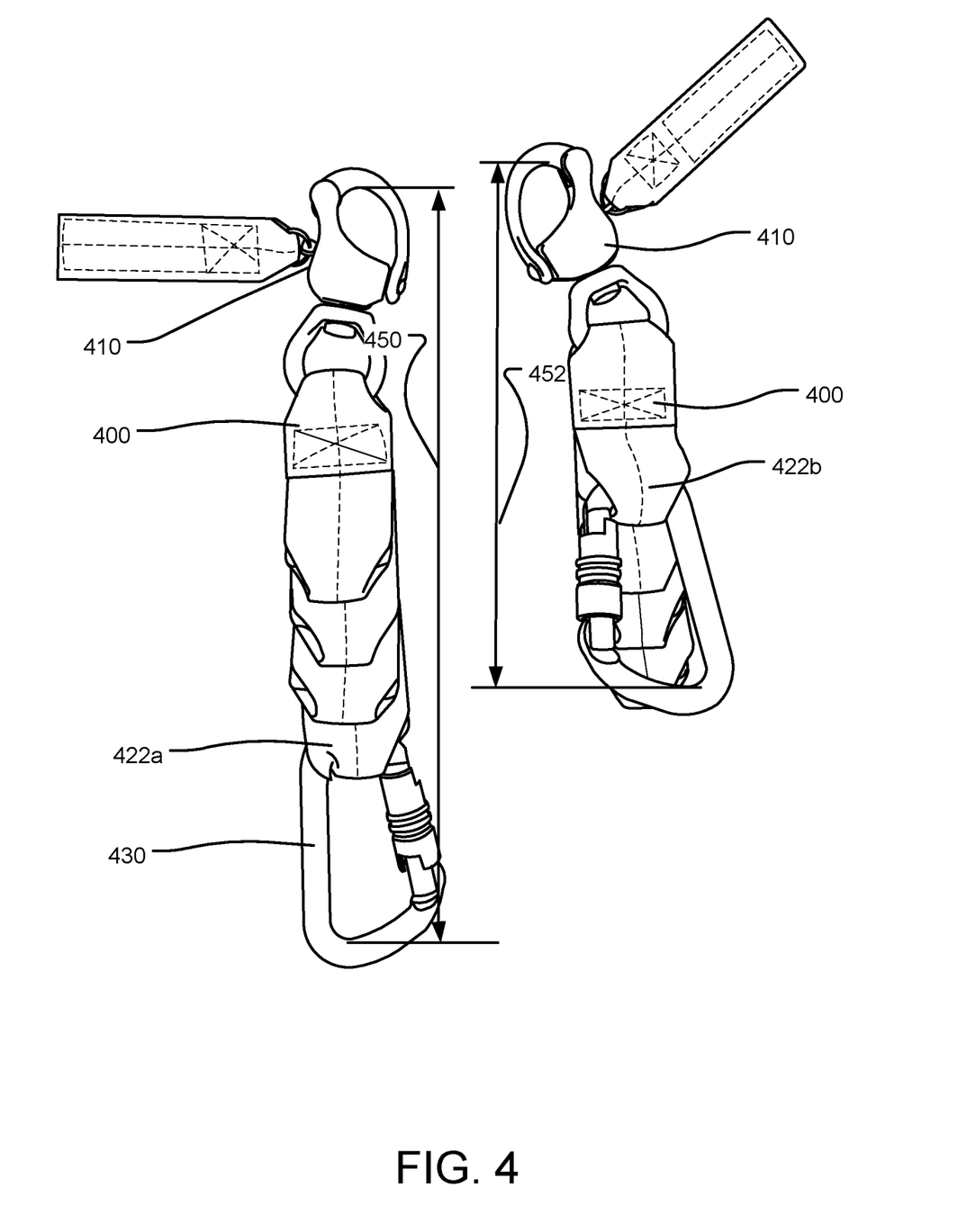
FIG. 4 illustrates an example of the adjustability of a strap according to the present disclosure.

With further reference to FIG. 4, the adjustability of a strap 400 is demonstrated. Specifically, the strap 400 shown in the left-hand portion of FIG. 4 has an attachment member 430 engaged with a first load loop 422a. In turn, a first effective strap length 450 is defined between the shackle 410 and the attachment member 430 when the attachment member 430 is engaged with the first load loop 422a. The strap 400 shown on the right-hand side of FIG. 4 has an attachment member 430 engaged with a second load loop 422b. In turn, a second effective strap length 452 is defined between the shackle 410 and the attachment member 430 when the attachment member 430 is engaged with the second load loop 422b. As can be appreciated, the second effective strap length 452 is less than the first effective strap length 450. As four load loops are defined in the strap 400, at least four effective strap lengths may also be defined to allow for adjustability of the position of an engaged object to the strap 400 relative to the shackle 410. However, in other examples, additional or fewer strap lengths may be provided by additional or fewer load loops.

Figure 6:
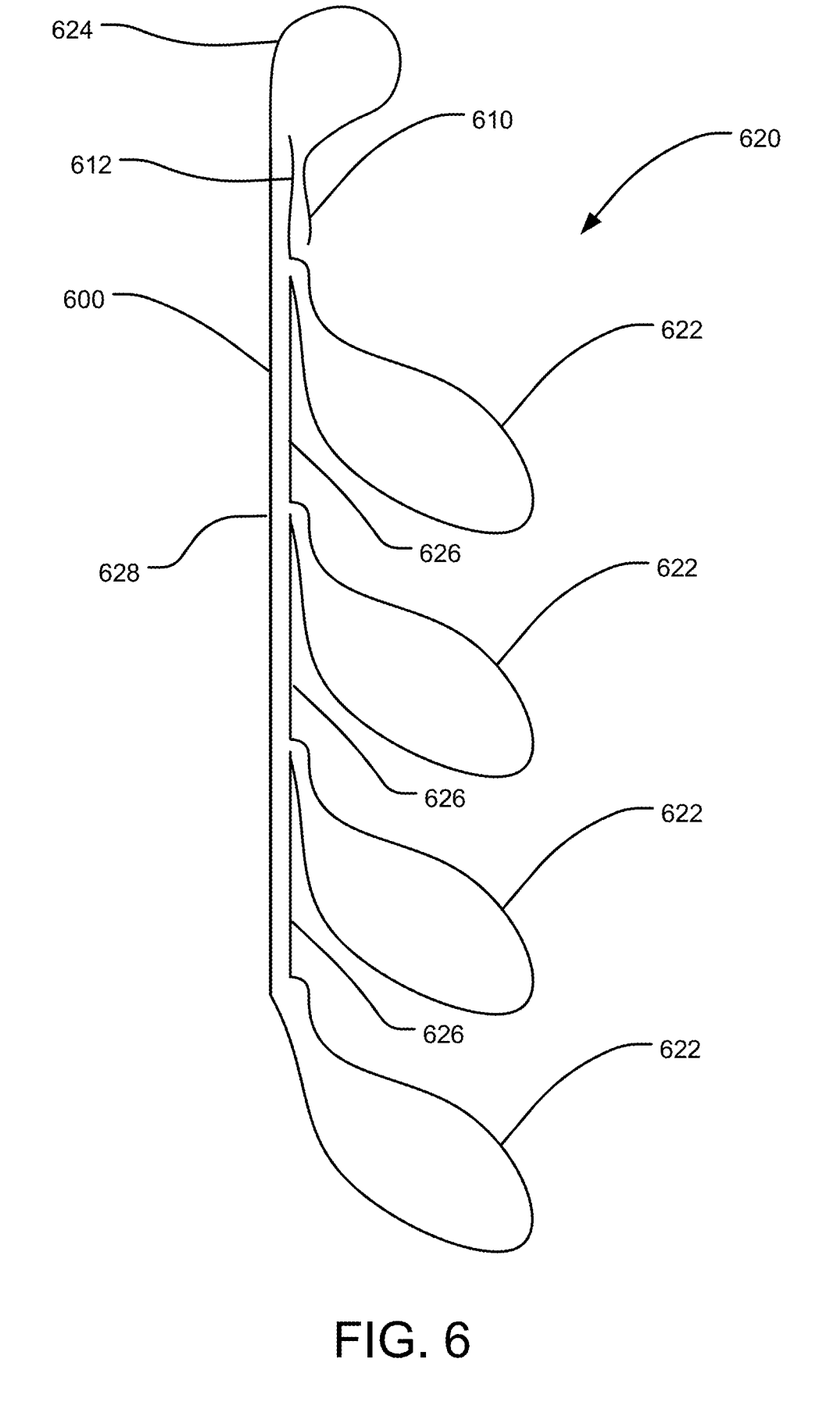
FIG. 6 illustrates a side view of an example webbing portion prior to sewing.
Figure 7:
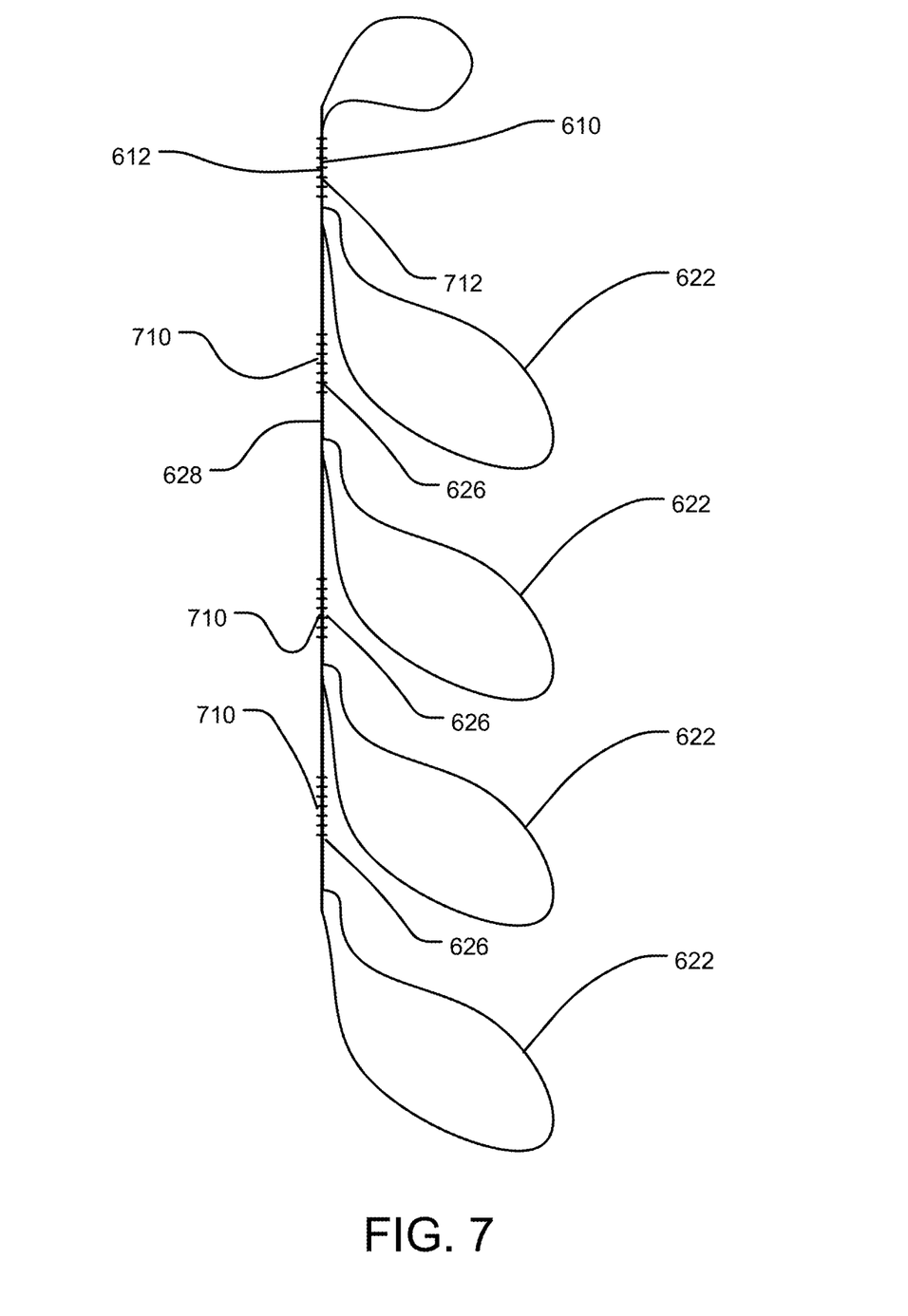
FIG. 7 illustrates a side view of an example webbing after sewing.

FIG. 6 illustrates a side view of an example of a length of webbing 600 prior to being secured to form a strap. Specifically, a continuous length of webbing 600 is provided that will form the webbing portion 620 of the strap. The continuous length of webbing 600 includes a first terminal end portion 610 and a second terminal end portion 612. The webbing 600 may be arranged such that the second terminal end portion 612 is manipulated to form a plurality of load loops 622 with attachment sections 626 aligned with a backing portion 628. In turn, the first terminal end portion 610 may be manipulated to form a shackle loop 624 (e.g., including by capturing a ring of the shackle as described above but not shown in FIG. 6 for clarity). The first terminal end portion 610 may be disposed relative to the second terminal end portion 612 and the backing portion 628 such that the second terminal end portion 612 is disposed between the backing portion 628 and the first terminal end portion 610. As such, the shackle loop 624 and the load loops 622 are formed by manipulating the free ends of the webbing 600 to define the loops as shown in FIG. 6. In turn, and with further reference to FIG. 7, stitching 710 may be provided to secure the webbing 600 to itself at the attachment sections 626. In this regard, a plurality of distinct load loops 622 are formed relative to the attachment section 626. Moreover, the terminal end portions 610 and 612 are captured by additional stitching 712 that passes through the backing portion 628, the second terminal end portion 612, and the first terminal end portion 610 to close the shackle loop 624 and to capture both terminal end portions of the webbing 600. As described above, the stitching 710 and/or 712 may comprise a box stitch pattern, which may or may not be reinforced with cross-stitching extending from the box stitching corners or may include row stitches at each attachment section 626.

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

What is claimed is:

1. A strap device for attaching a bag to a parachute harness, comprising:
   a shackle configured to be engageable with a ring of the parachute harness; and
   a webbing portion comprising a continuous length of webbing configured to include:
   a shackle loop disposed about to capture a portion of the shackle; and
   a plurality of load loops defined in the continuous length of webbing configured for receipt of a portion of an attachment apparatus through one of the load loops, the attachment apparatus being configured to attach to the bag for securing the bag to the parachute harness.

2. The strap device of claim 1, wherein the shackle loop comprises a terminal end portion of the webbing that is stitched to a backing portion of the webbing to secure the terminal end portion of the webbing and define the shackle loop.

3. The strap device of claim 2, wherein the plurality of load loops are defined by free portions of the webbing secured by stitching to the backing portion of the webbing.

4. The strap device of claim 3, wherein the plurality of load loops are formed at different positions along the backing portion to provide a plurality of strap lengths defined between the shackle loop and the respective load loops.

5. The strap device of claim 3, wherein the stitching comprises size E-69 nylon thread having a tensile strength of not less than about 8.5 lbf (4 kg).

6. The strap device of claim 5, wherein the stitching to secure the webbing comprises a box stitch pattern.

7. The strap device of claim 5, wherein the stitching to secure the webbing comprises row stitches comprising at least two rows.

8. The strap device of claim 1, wherein each of the plurality of load loops comprises inward folded portions of the webbing defined by an outer edge of the webbing in the load loop folded back toward a centerline of the webbing.

9. The strap device of claim 1, wherein the shackle comprises a snap shackle for quick release of a bail of the shackle opposite a ring engaged by the shackle loop.

10. The strap device of claim 1, wherein the continuous length of webbing comprises a tensile strength of not less than about 4,000 lbf (1,814 kg).

11. A parachute rigging system, comprising:
    a parachute harness adapted to engage a user to secure a parachute to the user, the parachute harness having a plurality of attachment rings on a main lift webbing of the harness;
    a plurality of strap devices each including a shackle engaged to respective ones of the plurality of attachment rings, and a webbing portion comprising:
    a continuous length of webbing configured to include a shackle loop disposed about to capture a portion of the shackle; and
    a plurality of load loops defined in the continuous length of webbing;
    an attachment apparatus extending through and captured by one of the load loops; and
    a bag engaged by the attachment apparatus.

12. The system of claim 11, wherein the shackle loop comprises a terminal end portion of the webbing that is stitched to a backing portion of the webbing to secure the terminal end portion of the webbing and define the shackle loop.

13. The system of claim 12, wherein the plurality of load loops are defined by free portions of the webbing secured by stitching to the backing portion of the webbing.

14. The system of claim 13, wherein the plurality of load loops are formed at different positions along the backing portion to provide a plurality of strap lengths defined between the shackle loop and the respective load loops.

15. The system of claim 14, wherein the stitching comprises size E-69 nylon thread having a tensile strength of not less than about 8.5 pounds.

16. The system of claim 15, wherein the stitching to secure the webbing comprises a box stitch pattern.

17. The system of claim 15, wherein the stitching to secure the webbing comprises row stitches comprising at least two rows.

18. The system of claim 11, wherein each of the plurality of load loops comprises inward folded portions of the webbing defined by an outer edge of the webbing in the load loop folded back toward a centerline of the webbing.

19. The system of claim 11, wherein the shackle comprises a snap shackle for quick release of a bail of the shackle opposite a ring engaged by the shackle loop.

20. The system of claim 11, wherein the continuous length of webbing comprises a tensile strength of not less than about 4,000 lbf (1,814 kg).

* * * * *